United States Patent [19]

Ajioka et al.

[11] Patent Number: 5,444,107
[45] Date of Patent: Aug. 22, 1995

[54] DEGRADABLE POLYMER COMPOSITION

[75] Inventors: Masanobu Ajioka; Katashi Enomoto; Akihiro Yamaguchi, all of Kanagawa; Hosei Shinoda, Aichi, all of Japan

[73] Assignee: Mitsui Toatsu Chemicals, Inc., Tokyo, Japan

[21] Appl. No.: 917,351

[22] Filed: Jul. 23, 1992

[30] Foreign Application Priority Data

Aug. 8, 1991 [JP] Japan ............................ 3-199163

[51] Int. Cl.$^6$ ........................... C08K 5/00; C08L 3/00
[52] U.S. Cl. ..................................... 523/124; 523/128; 524/47; 528/354; 528/361
[58] Field of Search ................... 523/124, 125, 128; 524/47, 50, 51, 52; 528/354, 361

[56] References Cited

U.S. PATENT DOCUMENTS

| | | | |
|---|---|---|---|
| 3,636,956 | 1/1972 | Schneider | 606/224 |
| 3,850,863 | 11/1974 | Clendinning et al. | 260/7.5 |
| 4,333,919 | 6/1982 | Kleber et al. | 424/15 |
| 5,100,669 | 3/1992 | Hyon et al. | 424/489 |
| 5,180,765 | 1/1993 | Sinclair | 528/354 |
| 5,234,977 | 8/1993 | Bastioli et al. | 524/47 |

FOREIGN PATENT DOCUMENTS

| | | |
|---|---|---|
| 327505 | 8/1989 | European Pat. Off. |
| 407617 | 1/1991 | European Pat. Off. |
| 444880 | 9/1991 | European Pat. Off. |

OTHER PUBLICATIONS

WPIL, AN-92-247298 (30), Derwent Publications & JPA-4168150, Jun. 16, 1992.
WPIL, AN-90-315322 (42), Derwent Publications & JPA-2222421, Sep. 5, 1990.

*Primary Examiner*—Paul R. Michl
*Assistant Examiner*—Lavonda DeWitt
*Attorney, Agent, or Firm*—Burns, Doane, Swecker & Mathis

[57] ABSTRACT

A degradable polymer composition essentially consisting of a mixture of a thermoplastic polymer composition primarily comprising polylactic acid or lactic acid-hydroxycarboxylic acid copolymer and one or more substance selected from starch and modified starch, and is a degradable polymer which does not cause problems such as environmental pollution and can be used for films, filaments and packaging materials, food packaging materials in particular.

4 Claims, No Drawings

DEGRADABLE POLYMER COMPOSITION

BACKGROUND OF THE INVENTION

1. Field of the Invention

The present invention relates to a degradable polymer composition and more particularly relates to a degradable polymer composition essentially consisting of a thermoplastic polymer composition primarily comprising polylactic acid and starch and/or a starch derivative. The thermoplastic and degradable polymer has recently drawn attention as a packaging material or a medical material.

2. Related Art of the Invention

The amount of plastics used for packaging has recently increased in view of beauty, sanitation, packing and transport of commodities. At the same time, a great amount of refuse discarded from households and factories has been increasing rapidly and causes a serious problem due to the shortage of landfill space in the periphery of large cities.

Conventional plastics for use in packaging are polyethylene, polypropylene, polystyrene, polyethylene terephthalate and polyvinyl chloride.

However, when these plastics are disposed in the natural environment, they remain without decomposition due to their stability and lead to damage in the scenery, pollution of the living environment for marine life and other various problems.

Many research and development activities have been carried out in order to prepare packaging materials from degradable polymers which do not generate these problems. For example, Japanese Patent Publications Sho 52-21530 and 52-42187 disclose techniques to provide degradability by blending non-degradable polymers, such as polyethylene, polypropylene and polystyrene with starch.

The resins prepared by these techniques collapse in shape by degradation of the starch. However, non-degradable polymer fragments remain intact and lead to environmental pollution.

On another hand, the amount of starch lower than the range causes a problem in that the original shape is retained after degradation of the starch portion, although film strength is decreased.

Polymers and copolymers of lactic acid have been known as thermoplastic and degradable polymers. The lactic acid polymer completely degrades in an animal body in the period of several months to a year. When these polymers are placed in a moist environment such as soil or sea water, the polymers start to decompose within several weeks and disappear in about a year. Decomposition products are lactic acid, carbon dioxide and water, all of which are harmless.

The raw material lactic acid can be prepared by fermentation of cheap materials such as corn starch and corn syrup, and can also be obtained from petrochemicals such as ethylene. U.S. Pat. Nos. 1,995,970, 2,362,511 and 2,683,136 disclose polymerization processes of lactic acid. U.S. Pat. Nos. 3,636,956 and 3,797,499 describe processes for preparing copolymers of lactic acid and glycolic acid. Lactic acid polymers are usually prepared from so-called lactide, a cyclic dimer of lactic acid. When glycolic acid is copolymerized, ring opening polymerization is carried out after mixing lactide with glycolide which is a dimer of glycolic acid. When the polymer is directly prepared by dehydrating condensation of lactic acid or a mixture of lactic acid and glycolic acid, a high molecular weight polymer cannot be obtained though reacted for a long time. On the other hand, straight chain polyester prepared by ring opening polymerization of lactide or a mixture of lactide and glycolide has a high molecular weight.

U.S. Pat. No. 4,333,919 discloses a formulation in which from 20 to 80% by weight of polyether antibiotics are incorporated in order to accelerate growth and feed efficiency in ruminants with a lactic acid-glycolic acid copolymer consisting of from 60 to 95% by weight of lactic acid and from 40 to 5% by weight of glycolic acid and having a weight average molecular weight of from 6,000 to 35,000. The patent describes that the formulation can be incorporated with auxiliary substances such as diluents, carriers, binders, excipients and other various adjuvants. Corn starch is included in these auxiliary substances.

The degradation rate of a polymer primarily comprising polylactic acid is almost determined by the hydrolysis rate of polylactic acid, and is relatively slow as compared with that of other microbiologically decomposable polymers.

Particularly in the case of polylactic acid having a high molecular weight, for example 50,000 or more, the degradation rate is remarkably slow and it is hence desired to find a method for accelerating the decomposition.

These polymers are usually processed into filaments or molded articles and utilized for biomedical slow-release materials, bone plates, screws and the above formulation for accelerating the growth and feed efficiency in ruminants. In these uses, the degradation rate in a living body is controlled by the addition of glycolic acid. However, an increased proportion of glycolic acid causes a change of polymer properties such as strength, hardness and elongation. Further, deterioration by moisture during use is accelerated and leads to problems.

Consequently, an object of the invention is to provide a degradable polymer composition which primarily comprises polylactic acid or a copolymer of lactic acid and hydroxycarboxylic acid, can be used for films, filaments and packaging materials, food packaging materials in particular, and has a suitable hardness and quick degradation rate.

SUMMARY OF THE INVENTION

One aspect of the present invention is a degradable polymer composition essentially consisting of a thermoplastic polymer composition primarily comprising polylactic acid having a molecular weight of 50,000~1,000,000 or a copolymer of lactic acid and other hydroxycarboxylic acids having molecular weight of 50,000~1,000,000, and starch and/or modified starch. The degradation rate of the resin composition can be controlled by the addition of starch or modified starch.

DETAILED DESCRIPTION OF PREFERRED EMBODIMENTS

The starch used in the process of the invention includes, for example, potato starch, corn starch, sweet potato starch, wheat starch, rice starch, tapioca starch, sago starch and other natural starch, decomposition products of starch, amylase and decomposition products of amylopectin.

Exemplary modified starch includes oxidized starch such as dicarboxylic acid starch, esterified starch such as acetylated starch, etherified starch such as carboxymethylated starch, crosslinked starch obtained by treating starch with acetaldehyde or phosphoric acid and cationic starch obtained by tertiary-aminating starch with 2-dimethylaminoethyl chloride.

The starch or modified starch used for the process of the invention is used after conversion into soluble starch, if desired. Solubilization can be carried out, for example, by heating at a temperature of 60° C. or more in the presence of water or an aqueous solution until starch particles sufficiently swell and burst to form a smooth and viscous dispersion in water.

The polymers used in the invention are a mixture of polylactic acid with a polymer of other hydroxycarboxylic acid or a copolymer of lactic acid and other hydroxycarboxylic acid. Useful other hydroxycarboxylic acid includes, for example, glycolic acid, 3-hydroxybutyric acid, 4-hydroxybutyric acid, 4-hydroxyvaleric acid and 6-hydroxycaproic acid.

These polymers can be directly prepared by dehydrating polycondensation of lactic acid or other hydroxycarboxylic acids or obtained by ring-opening polymerization of glycolide (GLD), $\epsilon$- caprolactone (CL) which is a cyclic ester of 6-hydroxycaproic acid or a mixture of these compounds. Other polymers which can also be used is a copolymer obtained by the transesterification reaction of polylactic acid with other hydroxycarboxylic acid polymer at high temperature. L-lactic acid, D-lactic acid and a mixture of these lactic acids can be used for constituting the polymers.

No particular limitation is imposed upon the molecular weight of the polymer. Preferred molecular weight is usually from 50,000 to 1,000,000. Molecular weight smaller than the range leads to unpractically low strength when the polymer is used for a film and food packaging materials. On the other hand, molecular weight larger than the range results in high melt viscosity and processing becomes difficult.

In the process of the invention, the degradation rate of the composition obtained can be controlled by changing the content of starch or modified starch in the composition. When the amount of starch is increased, weatherablity and tear resistance decreases. However, a high content of starch is suitable for uses which require high degradation rate. The amount of starch can be suitably decreased when high strength is required. Preferred range of the amount greatly differs depending upon uses and must be determined on the basis of balance between properties such as strength and degradation rate.

No particular restriction is imposed upon the method for blending the resin of the invention primarily comprising polylactic acid with starch or modified starch. The resin is usually heated, starch powder is added to the resin, and the resulting mixture is heat-kneaded, for example, with a roll mill. The kneading temperature is generally from 130° to 250° C., preferably from 130° to 200° C. in view of decomposition of the resin, starch or modified starch.

The polymer composition of the invention can comprise plasticizer, stabilizer, antioxidant, ultraviolet absorber, colorant and other additives. Compatibility improvers such as ethyl oleate or calcium stearate can also be used in order to enhance compatibility between the polymer primarily comprising polylactic acid and starch or modified starch.

The polymer composition of the invention can also comprise polylactic acid, well known thermoplastic polymers, plasticizer, and other reforming additives. In well known thermoplastic polymers, degradable polymers such as polyglycolic acid, poly-$\epsilon$-caprolactone and so on.

The polymer composition thus obtained can be processed by injection molding or extrusion. The polymer composition can also be dissolved in a solvent and cast into a film.

EXAMPLES

The present invention will hereinafter be illustrated in detail by way of examples. However, these examples are not intended to limit the scope of the present invention.

Example 1

In a sealed mixer, 90 g of poly-L-lactic acid pellets having an average molecular weight of 120,000 and 10 g of corn starch were uniformly kneaded at 190° C., extruded and pelletized. The pellets were hot-pressed at 180° C. into a film having a thickness of 25 $\mu$m. The film obtained was translucent and had a smooth surface. The film was buried in a compost pile at 40° C. for a degradation test and disappeared after 6 weeks.

Example 2

In a sealed mixer, 70 g of poly-L-lactic acid pellets having an average molecular weight of 120,000, 20 g of corn starch and 10 g of ethyl oleate were uniformly kneaded at 190° C., extruded and cut into pellets. The pellets were hot-pressed at 180° C. into a film having a thickness of 25 $\mu$m. The film thus obtained was translucent and had a smooth surface. The film was buried in a compost pile at 40° C. for a degradation test and disappeared after 4 weeks.

Example 3

In a sealed mixer, 60 g of poly-L-lactic acid pellets having an average molecular weight of 120,000, 30 g of soluble starch and 10 g of ethyl oleate were uniformly kneaded at 190° C., extruded and cut into pellets.

The pellets were hot-pressed at 180° C. into a film having a thickness of 25 $\mu$m. The film thus obtained was translucent and had a smooth surface. The film was buried in a compost pile at 40° C. for a degradation test and disappeared after 3 weeks.

Example 4

In a sealed mixer, 60 g of D,L-lactic acid-glycolic acid copolymer (50:50) pellets having an average molecular weight of 80,000, 30 g of soluble starch and 10 g of ethyl oleate were uniformly kneaded at 190° C., extruded and pelletized.

The pellets were hot-pressed at 180° C. into a film having a thickness of 25 $\mu$m. The film thus obtained was translucent and had a smooth surface. The film was buried in a compost pile at 40° C. for a degradation test. The film was broken into pieces after 2 weeks and disappeared after 2 months.

Example 5

In a sealed mixer, 40 g of poly-L-lactic acid pellets having an average molecular weight of 120,000, and 60 g of carboxymethylated starch having an etherification degree of 1.4~1.7 were uniformly kneaded at 190° C., extruded and cut into pellets.

The pellets were hot-pressed at 180° C. into a film having a thickness of 25 μm. The film thus obtained was translucent and had a smooth surface. The film was buried in a compost pile at 40° C. for a degradation test and disappeared after a week.

Example 6

In a sealed mixer, 40 g of poly-L-lactic acid pellet having an average molecular weight of 120,000 and 60 g of acetylated starch were uniformly kneaded at 190° C., extruded and cut into pellets.

The pellets were hot-pressed at 180° C. into a film having a thickness of 25 μm. The film thus obtained was translucent and had a smooth surface. The film was buried in a compost pile at 40° C. for a degradation test and disappeared after a week.

Comparative Example 1

The poly-L-lactic acid pellets which were used in Example 1 and had an average molecular weight of 120,000 were hot-pressed at 180° C. into a film having a thickness of 25 μm. The film was transparent and had a smooth surface.

The film was buried in a compost pile at 40° C. for a degradation test and still retained its shape even after 6 weeks.

Comparative Example 2

D,L-lactic acid-glycolic acid copolymer (50:50) pellets which were used in Example 4 and had an average molecular weight of 80,000 were hot-pressed at 180° C. into a film having a thickness of 25 μm. The film thus obtained was transparent and had a smooth surface.

The film was buried in a compost pile at 40° C. for a degradation test and still retained its shape even after 2 weeks.

Comparative Example 3

In a sealed mixer, 60 g of polyethylene pellets MIRASON NEO 23H (Registered Trade mark of Mitsui Petrochemical Industry Co.) and 40 g of soluble starch were uniformly kneaded at 190° C., extruded and cut into pellets. The pellets were hot-pressed at 180° C. into a film having a thickness of 25 μm. The film obtained was translucent. The film was buried in a compost pile at 40° C. for a degradation test and maintained its shape even after 6 months.

Example 7

In a sealed mixer, 60 g of poly-L-lactic acid having an average molecular weight of 120,000, 30 g of soluble starch and 10 g of ethyl oleate were uniformly kneaded at 190° C., extruded and cut into pellets. The pellets obtained were hot-pressed at 180° C. into a film having a thickness of 25 μm. The film obtained was translucent and had a smooth surface.

The film was buried in a compost pile at 40° C. for a degradation test and disappeared after 6 months.

Example 8

In a sealed mixer, 60 g of L-lactic acid and D,L-hydroxy acetic acid copolymer (90:10) pellets having an average molecular weight of 90,000, 30 g of soluble starch and 10 g of ethyl oleate were uniformly kneaded at 190° C., extruded and pelletized.

The pellets were hot-pressed at 180° C. into a film having a thickness of 25 μm. The film thus obtained was translucent and had a smooth surface. The film was buried in a compost pile at 40° C. for a degradation test. The film was broken into pieces after 6 weeks and disappeared after 2 months.

Comparative Example 4

L-lactic acid and D,L-hydroxy acetic acid copolymer (90:10) pellets having an average molecular weight of 90,000, which were used in Example 8 were hot-pressed at 180° C. into a film having a thickness of 25 μm. The film thus obtained was translucent and had a smooth surface.

The film was buried in a compost pile at 40° C. for a degradation test and still retained its shape even after 6 weeks.

What is claimed is:

1. A degradable polymer composition comprised of a mixture of a thermoplastic polymer composition consisting essentially of a lactic acid-hydroxycarboxylic acid copolymer having a molecular weight of 50,000~1,000,000 wherein the hydroxycarboxylic acid is other than lactic acid, and modified starch.

2. The degradable polymer composition of claim 1 wherein the lactic acid-hydroxycarboxylic acid copolymer is a lactic acid-glycolic acid copolymer.

3. The degradable polymer composition of claim 1 wherein the modified starch is one or more substances selected from the group consisting of oxidized starch, esterified starch, etherified starch, crosslinked starch and cationic starch.

4. The degradable polymer composition of claim 1 wherein the lactic acid is selected from the group consisting of L-lactic acid, D-lactic acid and mixtures thereof.

* * * * *